(No Model.)
R. M. HUNTER.
ELECTRIC RAILWAY.
No. 448,653. Patented Mar. 24, 1891.
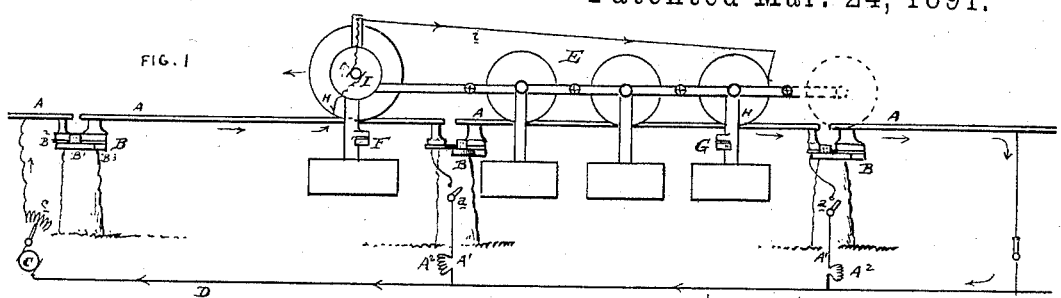
FIG. 1
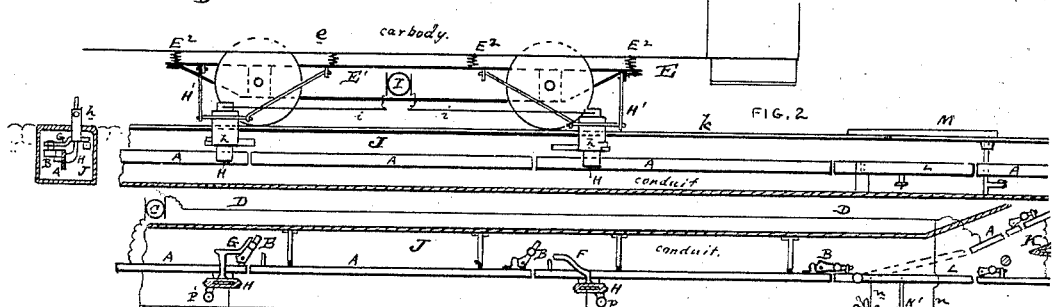
FIG. 2
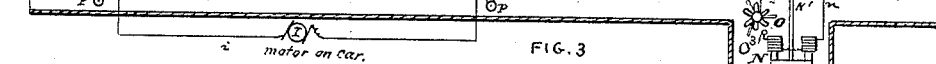
FIG. 3
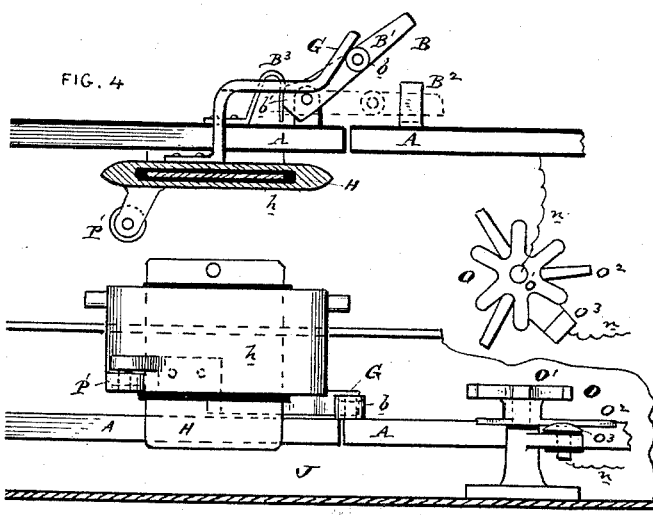
FIG. 4
FIG. 5
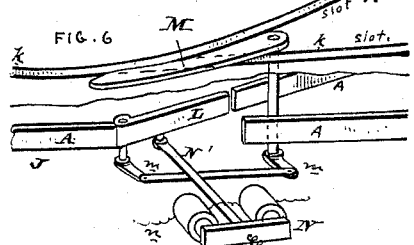
FIG. 6
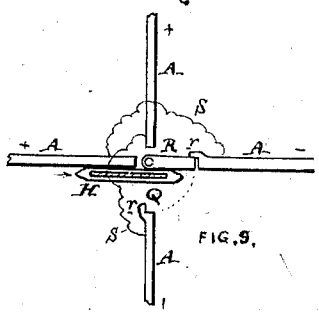
FIG. 9
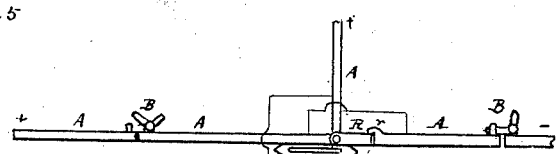
FIG. 7
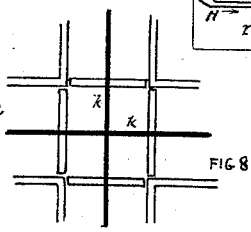
FIG. 8
Attest
E. M. Breckinridge
E. McDermott
Inventor
R. M. Hunter
THE NORRIS PETERS CO., PHOTO-LITHO., WASHINGTON, D. C.

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 448,653, dated March 24, 1891.

Application filed March 24, 1887. Serial No. 232,352. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

In my applications, Serial No. 202,950, filed May 22, 1886, and Serial No. 215,458, filed October 6, 1886, is described a system of electric railways embodying the principle of operating cars in series circuit whether in overhead or surface railways; but the specific feature there claimed related to overhead or suspended conductors. In this application I have embodied the same general features specifically applied to surface roads using any of the slotted conduits set out in my various applications. For instance, in my application, Serial No. 171,625, filed July 14, 1885, is shown a construction which is especially adapted to this invention, as the sections of the series conductor may be made of equal length with the conduit-sections, whereby the fitting may be performed in the shop.

In this application I also employ a peculiar form of switch for connecting or disconnecting the sections of working-conductor, but which in general principle is similar to that set out in my applications above referred to.

Another feature of this application is the series main and branch tracks with the switches, similar in some respects to what is set out in my application, Serial No. 228,533, filed February 23, 1887; but in this case they are applied to a series system, whereas in that application they were applied to a multiple-arc system. In this case, however, I make the switches automatic in their action upon the passage of the electrically-propelled vehicle.

Another part of this application has reference to cross-tracks where two electric railways cross each other whether said cross-railways are operated from the same or different sources of power.

My invention also comprehends a minor feature fully set out hereinafter.

In the drawings, Figure 1 is a side elevation of an elevated series-railway system employing my improved switches. Fig. 2 is a sectional elevation of a surface railway using a slotted conduit and embodies my invention. Fig. 3 is a plan view of the conductors and conduit with the upper part of the latter broken away. Fig. 4 is an enlarged plan view showing construction of switch and operating device therefor and also current-collector and circuit-controlling device for operating the conductor-switch. Fig. 5 is a side elevation of same with the inclosing-conduit in section. Fig. 6 is a perspective view of the slot and conductor switches and shows their relation and operative mechanism. Fig. 7 is a plan view of a crossing of two electric railways operating from the same source. Fig. 8 is a plan view of the crossing tracks and slots of the conduit when employed. Fig. 9 is a view similar to Fig. 7, but in which the two railway-conductors have no connection.

A are the conductor-sections, which are connected electrically by switches B of any suitable construction. The generator C is connected to one end of this working-conductor through a resistance-changer $c$, if desired, and with the other end of the conductor by a return-circuit D, which may be buried or suspended or may be the rails. If desired, in a long line or where the line has a number of branches any portion thereof not in use may be cut out of circuit by branch conductors A' and switches $a$, and when such is done a resistance $A^2$ may be inserted into circuit equal to the resistance of the conductors cut out to make the total resistance always remain the same. This, however, would hardly be necessary or desirable as a rule, as it would incorporate a wasteful resistance into the line.

E represents the car or vehicle or train, and is provided with an electric motor I in the motor-circuit $i$ in circuit with the conductor-sections A on each side of the open switch or switches, which are operated by suitable cams or operating parts F G, arranged closer together than the contacts of the motor-terminals with the conductors, and yet separated a distance equal at least to the length of one section A of conductor. These switch-operating cams may be located a distance apart less, equal to, or greater than the wheel-base of the vehicle or train. In Fig. 1 it is shown as less and in Fig. 2 it is shown as greater. When greater, it is evident that the sections A may be as long or longer than the wheel-base of the car. The switches consist of horizontally-swinging pivoted levers B', electrically connected to one section A, and when closed press in contact with springs B² on the next section A. The rear of the lever B' is made with faces b' at angles to each other, against which a spring B³ presses, so as to keep said lever open or closed, according as to which position it is pushed by the cams F and G. The lever B' is preferably provided with a roller b, against which the cams F and G press in operating it. These cams are carried by the vehicle in any convenient manner.

Referring now to Figs. 2 and 3, in which the construction is applied to a slotted conduit, we have the conductors A supported from the side walls of the conduit J, of course being properly insulated therefrom. The car E shown here consists of the body e, mounted by springs E² upon a truck-frame E', carrying the motor I. Hinged to the truck-frame by links H' or otherwise to admit of lateral play are the collectors h h, which project through the slot k preferably beyond the wheel-base and carry the contacts H, which collect the current from the conductor-sections. The cams F and G are secured to these collectors and are carried thereby, and are insulated from them to prevent escape of current from the switches; or, if desired, the rollers b of the switches may be insulated. The motor-terminals are connected with the motor-circuit, which is connected with the contacts H.

K represents a branch railway and is in all material respects the same as the main railway. As shown, it is in series with the main railway. At the point of branching the slotted conduit is provided with a slot-switch M, and the conductor-section is provided with a switch L, pointing in opposite directions with the slot-switch M and is adapted to be put into line with the branch or main line and thereby guide the contacts of the collectors. These switches M and L may be operated independently or together. As shown, they are connected together by parts m, so that when one is shifted the other is shifted also. These switches (or switch L alone) are shifted by an electric motor N of any suitable construction through the mediation of rod N', connecting with the switch L or by otherwise suitably connecting it. This switch-motor N is in circuit n and is controlled by a circuit breaker or closer O, which consists of a star-shaped cam-wheel O', carrying the star-contact O², which when moved around comes in contact or breaks contact with the fixed contact O³. There are twice as many arms on O' as on O². On the collectors h are contact-rollers P P', which operate on the wheel O' and turn it intermittingly as the collectors (on the cars which must pass on to branch) pass. (See Fig. 3.) The roller P closes the circuit n, and the motor N pushes the switch L over to the line of the branch conductor, and the slot-switch M is drawn over so as to expose the branch slot and to guide the collectors to the branch track. The switches remain in such positions until the roller P' on the rear collector turns the circuit-breaker O so as to open the circuit n, when the spring n' returns the parts to position shown in Fig. 3 after passage of collectors. I do not limit myself to any particular means for operating these switches. At points of crossing of two electric railways a break must be made in each of the conductors to allow of the passage of the respective collectors. (See Figs. 7 and 9.) These breaks may be spanned by a loose bridging-switch R, whose lateral movements may be limited by the stops r on the sections A. This switch R may be in circuit with the sections, as shown in Fig. 7, or independent thereof, as shown in Fig. 9, until turned around in line with the respective line over which the collector is passing.

In the construction shown in Fig. 7 the two lines of conductors are shown as united at their juncture by the switch R; but the preferred construction is shown in Fig. 9, where the switch is electrically independent of the conductors, though by contact it may be in circuit with the section against which it presses. Again, it will be observed that the hinge-point of the switch R is toward the approaching collector, so that the collector or an extension in front of it in passing pushes the switch R into the proper position for carrying the collector over the break. It is advisable to make this switch in one of the sections A between two of the switches B, though this location is not essentially particular or necessary. The divided sections A, if not at the division of two sections, are bridged by suitable conductors S, as indicated in Fig. 9. It is evident that these crossing conductors are equally applicable to overhead conductors as well as underground conductors, whether the overhead conductors support the vehicle or are used as conductors only, and, broadly considered, the switch R might be dispensed with if the collector makes contact with the conductor for a length greater than the break or gap.

While I prefer the constructions shown, I do not limit myself to the details thereof, as they may be modified in various ways without departing from my invention.

Having now described my invention, what I claim as new, and desire to secure by Letters Patent, is—

1. The combination, with the sectional conductor, of two or more electric locomotives, each bridging a break in said conductor, and rotary horizontally-swinging switches controlling connection between sections of said conductor and adapted to be operated by the said locomotives.

2. The combination of a branching slotted conduit, a slot-switch at point of branching, a conductor-switch at point of branching and pointing in the opposite direction to the slot-switch, and electrically-actuated means actuated by the passing car to automatically operate the conductor-switch.

3. The combination of a branching slotted conduit, a slot-switch at point of branching, a conductor-switch at point of branching and pointing in the opposite direction to the slot-switch, and means actuated by the passing car to automatically operate the conductor-switch and the slot-switch.

4. The combination, in a series electric railway, of a sectional main conductor, a series of switches in a slotted conduit, a branching railway with a corresponding sectional branch conductor and switches, two contact devices adapted to either conductor, connected to the two terminals of a propelling-motor on the railway, and always bearing on the conductor on opposite sides of a break therein, a movable conductor-guide at the branching-point for leading the two contacts from main to branch conductor, an electric motor to operate said conductor guide or switch, and means controlled by the passing electrically-propelled vehicle to put said switch electric motor into or out of action.

5. In an electric railway, a conductor made in sections with switches to electrically connect or disconnect said sections upon the passage of a car, in combination with a generator connected with said conductor-sections in series and auxiliary cut-out circuits to cut out of action a portion of said conductor-sections which may not be in use.

6. In an electric railway, a conductor made in sections with switches to electrically connect or disconnect said sections upon the passage of a car, in combination with a generator connected with said conductor-sections in series, auxiliary cut-out circuits to cut out of action a portion of said conductor-sections which may not be in use, and means to insert a resistance into the line-circuit equal to that portion of the line cut out of circuit.

7. In an electric railway, a line conductor made in sections, in combination with horizontally-movable switches to connect or disconnect said sections, whereby they are connected in series, a traveling electrically-propelled vehicle having two collectors separated a distance not less than the length of one of the sections and making contact therewith, means carried by the vehicle to operate said switches so as to cause the current to pass through the collectors, and suitable springs to hold said switches open or closed, as the case may be.

8. The combination of conductor-sections A in series, switch B′, connected to one section and adapted to make contact with the next and having faces $b'$ near its pivot-point, spring $B^3$, adapted to press against the faces $b'$ and hold the switch open or closed, an electrically-propelled vehicle receiving electricity from separate sections, and means carried by the vehicle to operate said switches B′.

9. A slotted conduit, in combination with a sectional conductor located therein, switches to connect said sections in series, a car, an electric motor on said car, current-collecting devices carried by the car entering the conduit and making contact with the conductor, and switch-operating devices carried by the current-collecting devices.

In testimony of which invention I hereunto set my hand.

RUDOLPH M. HUNTER.

Witnesses:
RICHD. S. CHILD, Jr.,
E. M. BRECKINREED.